(12) United States Patent
Shuo

(10) Patent No.: US 8,244,181 B2
(45) Date of Patent: Aug. 14, 2012

(54) PORTABLE PERSONAL SIM CARD

(75) Inventor: Jeffrey Shuo, Diamond Bar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 12/471,797

(22) Filed: May 26, 2009

(65) Prior Publication Data

US 2010/0304670 A1    Dec. 2, 2010

(51) Int. Cl.
*H04B 7/00*    (2006.01)
(52) U.S. Cl. .................. 455/41.2; 455/41.1; 455/558
(58) Field of Classification Search .............. 455/550.1, 455/551, 558, 41.1, 41.2
See application file for complete search history.

(56) References Cited

U.S. PATENT DOCUMENTS

| | | | |
|---|---|---|---|
| 6,646,957 B2 * | 11/2003 | Martin et al. | 368/10 |
| 7,778,670 B2 * | 8/2010 | Kim | 455/558 |
| 2002/0147926 A1 * | 10/2002 | Pecen et al. | 713/201 |
| 2002/0197991 A1 | 12/2002 | Anvekar et al. | |
| 2004/0180657 A1 | 9/2004 | Yaqub et al. | |
| 2006/0148404 A1 | 7/2006 | Wakim | |
| 2007/0042808 A1 | 2/2007 | Ruuttu | |
| 2007/0253251 A1 | 11/2007 | Mizushima et al. | |
| 2008/0101272 A1 * | 5/2008 | Hayes et al. | 370/313 |
| 2010/0035587 A1 * | 2/2010 | Bennett | 455/414.1 |

FOREIGN PATENT DOCUMENTS

| | | |
|---|---|---|
| EP | 1075155 A1 | 2/2001 |
| GB | 2377788 A | 1/2003 |
| WO | WO0176309 A1 | 10/2001 |
| WO | WO2007090042 A2 | 8/2007 |

OTHER PUBLICATIONS

International Search Report and Written Opinion—PCT/US2010/036203, ISA/EPO—May 18, 2011.
ISA/EPO—May 18, 2011.

* cited by examiner

*Primary Examiner* — Raymond Dean
(74) *Attorney, Agent, or Firm* — James T. Hagler

(57) ABSTRACT

Devices and methods store provisioning data for use in one or mobile devices within a SIM card enclosed within a personal article, such as a wrist watch or item of jewelry. A close range communication link, such as a near field communication (NFC) protocol link, is used to transmit the provisioning data from the personal article to one or more mobile devices. The close range communication link may also be used to transmit updated provisioning data received by a mobile device in an over the air updating procedure via a cellular communications network link to the personal item for storage in the SIM card housed within a personal article. The mobile device may authenticate itself to the personal article prior to the transmission of provisioning data between the devices.

70 Claims, 10 Drawing Sheets

PORTABLE PERSONAL SIM CARD

FIELD OF THE INVENTION

The present invention relates generally to cellular telephone technologies, and more particularly to a system and method for wirelessly providing communication provisioning data to multiple devices from a portable personal article.

BACKGROUND

Recent technological developments have made wireless digital communication more and more commonplace. In addition to the ubiquitous cellular telephone, other personal mobile devices conduct digital communications with a variety of wireless networks. It is becoming commonplace for users to carry more than one of personal data assistants (PDA's), palm-top computers, laptop computers, wireless electronic mail receivers (e.g., the Blackberry® and Treo® devices), multimedia Internet enabled cellular telephones (e.g., the iPhone®), and similar personal electronic devices which permit voice and/or data communications with wireless networks.

Typically, mobile communication devices employ their own provisioning data to configure wireless communications, with the provisioning data stored on an individual Subscriber Identity Module (SIM), commonly known as a SIM card. Provisioning data contains all of the necessary settings and information to enable the mobile device to establish a communication link with a particular cellular telephone or wireless network. When each mobile device contains its own SIM card, a different service provider account is required for each mobile device to access the cellular telephone network. This requirement can cause user frustration as device will involve a service provider bill and have a different telephone number. While the same SIM card may be used in a plurality of mobile devices, this requires physically removing the SIM card from one mobile device and inserting it into another. This process can be cumbersome, time consuming, and inconvenient.

SUMMARY

A method and apparatus for providing provisioning data stored on a single SIM card to a plurality of mobile devices is disclosed. Provisioning data is stored in a SIM card contained within a personal article, such as a piece of jewelry or wristwatch. The personal article establishes a close range communications link with a mobile device within the effective range of the close range communications link and transmits the provisioning data stored on the SIM card. The mobile device uses a second communication link, different from the close range communications link, to connect with a cellular or other wireless communication network using the transmitted and received provisioning data. Once the provisioning data has been exchanged the close range communications link may be terminated and the mobile device can establish or receive a wireless digital communication call using the second communication link.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
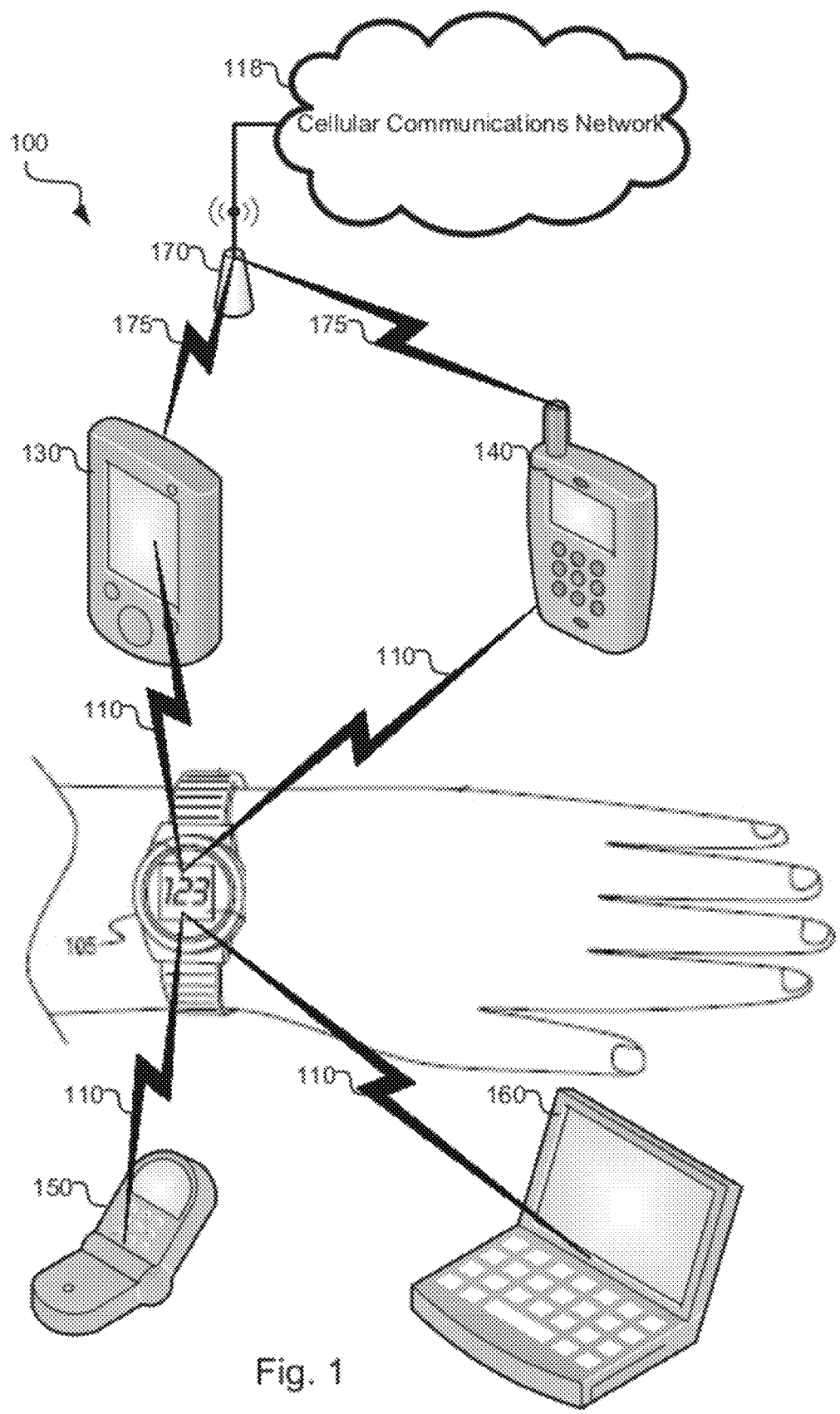
FIG. 1 is a system block diagram of a wireless network including a number of mobile devices.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "handheld device" refer to any one or all of wireless gaming controllers, cellular telephones, personal data assistants (PDA's), palm-top computers, wireless electronic mail receivers (e.g., the Blackberry® and Treo® devices), multimedia Internet enabled cellular telephones (e.g., the iPhone®), Global Positioning System (GPS) receivers and similar personal electronic devices which include a programmable processor and memory, and communication transceiver capable of connecting to a wired or wireless network. As used herein, the terms "personal article," "watch," and "jewelry" are used interchangeably to refer to a personal article which houses a SIM card with at least the provisioning data for at least one service provider stored thereon. Some embodiments refer to cellular telephone network systems including cell towers of such networks; however, the scope of the present invention and the claims encompass any wired or wireless communication system, including for example, Ethernet, WiFi, WiMax, and other wireless data network communication technologies.

The various embodiments make use of wireless proximity-limited communication technologies to exchange provisioning data between a personal article and one or more mobile devices. A variety of wireless proximity-limited communication technologies may be used for this purpose. For example, near-field communications (NFC) protocol technologies may be used. NFC protocol technology devices operate in the unregulated RF band of 13.56 MHz and fully comply with existing contactless smart-card technologies, standards, and protocols such as FeliCa and Mifare. NFC-enabled devices are interoperable with contactless smart-cards and smart-card readers conforming to these protocols. The effective range of NFC protocol communications is approximately 0-20 cm (up to 8 in.) and data communications terminates either by a command from an application using the link or when the communicating devices move out of range.

Evolving from a combination of contactless, identification and networking technologies, the NFC protocols are short-range wireless connectivity standards. A number of international standards have been established for NFC protocols, including for example: ISO/IEC 14443; ISO/IEC 15693; ISO/IEC 18092; ISO/IEC 21481; ISO/IEC 22536; ISO/IEC 23917; ISO/IEC DIS 28361; ECMA-340, referred to as NFCIP-1; ECMA-352, referred to as NFCIP-2; ECMA-356; ECMA-362; ECMA-373; ECMA/TC32-TG 19/2006/057; NFC-WI; and NFC-FEC.

However, the embodiments and the claims are not necessarily limited to any one or all of the NFC protocols, and instead may encompass any close range (i.e., proximity-limited) wireless communication link (referred to collectively herein as closer range communication links). Any wireless proximity-limited communication technology may be used in some of the embodiments. In addition to the NFC protocols listed above, wireless proximity-limited communication links may be established using other close range communication media, including for example radiofrequency identification (RFID) tag protocols and the IRDA (Infrared Data Association) protocol. Also, other close range wireless protocols and standards may be developed and may be used in the various embodiments in the same manner as NFC protocol devices. Further, longer range wireless technologies and protocols may be used for the purpose of transmitting provisioning data from a personal article to a mobile device. While the effective range of such technologies is greater than NFC protocols, the effective range may be sufficiently short to be considered a close range communication technology for purposes of the disclosed embodiments. For example, WiFi, Bluetooth® (which communicates using the 2.4 GHz frequency band), UWB (Ultra Wideband), IEEE 802.15.4, and Zigbee® wireless communication protocols and standards may also be implemented with the various embodiments. If necessary certain modifications to the circuitry allowing such longer range wireless technologies may be made to shorten the effective range. For example, the power of transmitters may be limited for provisioning data transmission communications, such that two devices must be relatively close together (e.g., within a few feet of each other) in order to send and receive the communications. As another example, round-trip communication delay limits may be imposed such that authentication and provisioning data communications can only occur if the round trip of such signals is less than a threshold set to reject signals sent from more than a dozen feet or so, which maybe as short as two to three feet separation.

For simplicity of reference, the various embodiments and the claims refer to "close range communications" and "near field communications" in order to encompass any and all wireless proximity-limited communication technologies. References herein to "close range communication links" and "near field communications" (NFC) are not intended to limit the scope of the description or the claims in any way other than the communications technology will not exchange provisioning data beyond about three meters (about twelve feet). In a preferred embodiment, the communication range is limited to less than about one meter (about three feet). In a further preferred embodiment, the communication range is limited to less than about one foot, and in some embodiments the communication range is limited to approximately 0-20 cm (up to 8 in.). In order to reflect this distinction, descriptions of embodiments using links with communication ranges of approximately 0-20 cm (up to 8 in.) are referred to as "NFC protocol" links. Therefore, references to "near field communication protocol" and "NFC protocol" communications are intended to be limited to communication transceivers and technologies with ranges provided by the various NFC protocols and standards listed above, but may also include RFID transceivers and technologies with a similarly limited communication range.

With close range communications technologies, like the NFC protocol, it is possible to wirelessly connect a personal article equipped with a CRC transceiver one or more mobile devices to exchange provisioning data-easily and securely. Solution vendors argue that the intuitive operation of NFC protocol systems makes the technology particularly easy for consumers to use ("just touch and go"). Familiar applications of NFC protocol technology are electronic pass keys used in building security systems, mass transit fare card systems, and smart credit cards which can be brought close to a point of sale reader to complete a transaction. While the inherent security resulting from its very short communication range makes the technology ideal for mobile payment and financial transaction applications, the same characteristic provides a degree of security for transmitting mobile device provisioning data.

Traditional mobile devices require the use of a SIM card to store the provisioning data that allows access to a service provider's wireless digital communication network. The SIM card is a removable memory chip or smart card used in GSM and UMTS mobile devices to store the provisioning data, such as the service-subscriber key used to identify a mobile device to wireless communication networks that enables the mobile device to access a particular communication network. Users can transfer provisioning data among different mobile devices by simply removing the SIM card from one mobile device and inserting it into another. A typical low cost SIM card has a small memory, 2-3 KB, which may only be enough to contain provisioning data and perhaps a personal phone directory. The provisioning data stored in a SIM card is used by the mobile device directly. SIM cards with additional applications are available in many storage sizes, the largest being capable of storing up to 1 gigabyte of information. Smaller sized SIM cards, capable of storing up to 32 KB or 16 KB, are the most prevalent in areas with less-developed GSM networks.

The use of a SIM card is mandatory in GSM cellular telephone networks. The provisioning data stored in SIM cards includes network specific information used to authenticate and identify subscribers to a network, the most important of which are the ICCID, IMSI, Authentication Key (Ki), and Local Area Identity (LAI). The SIM card provisioning data also includes other carrier specific data, such as the SMSC (Short Message Service Centre) number, Service Provider Name (SPN), Service Dialing Numbers (SDN), and Value Added Service (VAS) applications. The equivalent of a SIM card in UMTS cellular telephone networks is called the Universal Integrated Circuit Card (UICC). CDMA phones may contain an analogous Removable User Identity Module (RUIM).

While the portability of SIM cards makes them useful for distributing provisioning data, their use is not without disadvantage. For example, because the SIM card may be inserted into any mobile device, if the SIM card is itself lost or a mobile device containing the SIM card is lost, other users may utilize the SIM card without authorization from the rightful owner. If the service contract provider is not informed of the loss and the service contract associated with the SIM card is not terminated, unscrupulous finders of the SIM card may continue to utilize the provisioning data found on the SIM card without paying for the usage as it will continue to be charged to the owner of the SIM card. In addition, while SIM cards are interchangeable, the inconvenience of actually removing the SIM card from one mobile device and inserting it into another mobile device often results in users possessing multiple SIM cards so that they have one for each mobile device that is carried. If mobile devices are equipped with their own SIM card, each of the multiple SIM cards will contact provisioning data for a different service provider contract. While all or some of the multiple SIM cards may be serviced by the same service provider, users are still left with the task of managing multiple service provider contracts. In many cases, users must manage as many service provider contracts as they have mobile devices.

To overcome these disadvantages, the various embodiments provide a SIM card housed in a personal article that is rarely, if ever, out of the user's article. For example, the SIM card may be housed in a wristwatch or piece of jewelry (e.g., a necklace) that is worn most of the time. By coupling the SIM card to a transceiver of any of a variety of close range communication technologies, the provisioning data stored on the SIM card housed within the personal article may be transmitted to any of a variety of mobile devices carried by a user. In this manner, wireless digital communications on each of the variety of mobile devices can be supported by a single SIM card, and thereby utilize the provisioning data associated with a single service provider contract.

The various embodiments disclose exchanging provisioning data stored on a SIM card included within the personal article to one or more mobile devices in close proximity to the personal article. For sake of simplicity, the various embodiments are described as implementing a SIM card within the personal article. However, one of skill in the art would appreciate that the method and apparatus described herein may be implemented using any of the variety of memory chips, processors and smart cards.

In overview, the various embodiments leverage close range communications to support wireless digital communications on one or more mobile devices using provisioning data stored on the same SIM card. The use of close range communication technology enables users to be aware of communications taking place between one or more mobile devices and a personal article housing a SIM card. NFC protocol technologies are limited to such short ranges that users must touch or nearly touch a mobile device and the personal article together to establish the communication link. This physical action is referred to herein as a "proximity event." Analogous proximity events may occur in longer range communication protocols which require the personal article and mobile device to become physically aware of one another to generate a communication link. Such analogous proximity events may require a user to authenticate each device to secure the communication link. In the various embodiments, this proximity event may be conducted with any of a variety of mobile devices and the personal article housing the SIM card. Upon such a proximity event, the personal article uses a close range communications transceiver (CRC transceiver) of a close range wireless protocol to send provisioning data stored on the SIM card to the mobile device. Subsequent wireless digital communications may then be conducted on the mobile device through a cellular communication network using the provisioning data downloaded from the SIM card housed in the personal article. In order to enable such a close range communications link, compatible CRC transceivers are included in both the personal article and in each of the one or more mobile devices.

FIG. 1 is a system diagram of a communication network 100 including a plurality of mobile devices 130, 140, 150, 160 in communication with a personal article 105 which in this example is a wristwatch. A SIM card 180 (see FIG. 3) is housed within the personal article 105. The SIM card 180 stores provisioning data which contains the necessary settings and information to enable any of the plurality of mobile devices 130, 140, 150, 160 to communicate over a wireless digital communications network, such as a cellular communications network 118. The personal article 105 further includes a close-range wireless transceiver 189 (see FIG. 3) capable of establishing a close range communications link with and transmitting the provisioning data stored in the internal SIM card to any of a plurality of mobile devices 130, 140, 150 and/or 160. For illustration purposes, the plurality of mobile devices may include, but are not limited to, an internet enabled cellular telephone130, a PDA 140, a cellular telephone150, and/or a laptop computer 160. Each of the plurality of mobile device 130, 140, 150, 160 are configured with an antenna 194 and CRC transceiver 193 (see FIG. 2) for receiving provisioning data from the personal article 105.

Once the provisioning data stored on the SIM card internal to the personal article 105 is received and stored in memory, such as a provisioning data buffer/memory 192 of a mobile device (e.g., 130, 140), the mobile device 130, 140 may establish a cellular communication link 175 with a base station 170. Once the cellular communication link 175 is established with the base station 170, a wireless digital communication call may be conducted over the cellular communications network 118 in a conventional manner.

The close range communication transceivers in the personal article 105 and the mobile devices 130, 140, 150, and/or 160 may be any of a number of different known transceivers (including for example RFID tags) capable of transmitting and/or receiving data in accordance with any of a number of different close range techniques, such as defined in the NFC protocols and standards listed above. For example, the close range communications transceiver may be a NFCIP-1 or NFCIP-2 transceiver, an RFID transceiver or RFID tag, or use Bluetooth® (i.e., communication in the 2.4 GHz frequency band), infrared, IrDA (Infrared Data Association), UWB (Ultra Wideband). Longer range communication protocol transceivers, such as a Bluetooth transceiver, may also be used with protections provided to prevent unauthorized communication with mobile devices possessed by people standing near by.

Figure 2:
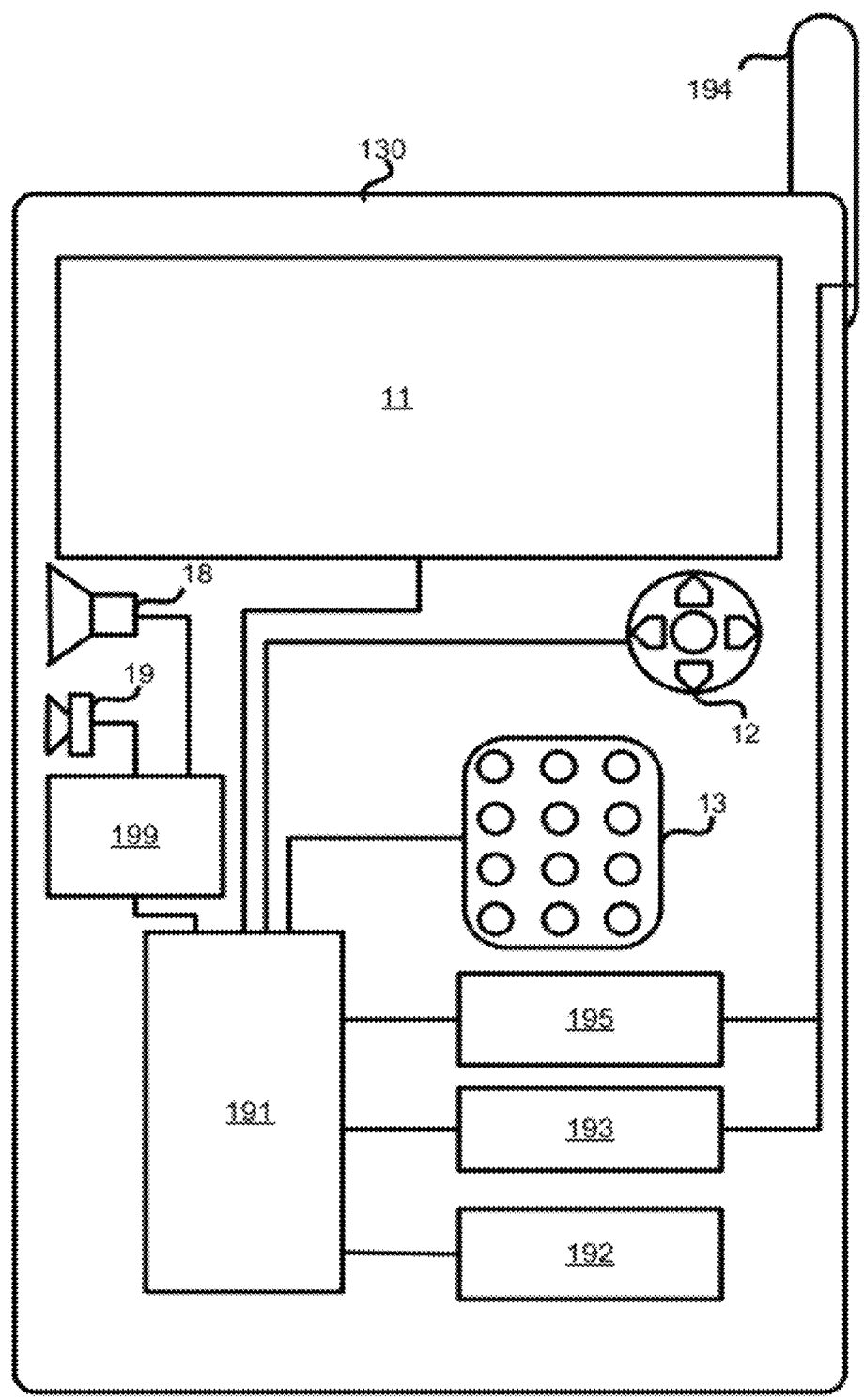
FIG. 2 is a circuit block diagram of an example mobile device suitable for use with the various embodiments.

Typical mobile devices suitable for use with the various embodiments will have in common the components illustrated in FIG. 2. For example, the exemplary mobile device 130 may include a processor 191 coupled to internal memory 192 and a display 11. Additionally, the mobile device 130 will have an antenna 194 for sending and receiving electromagnetic radiation that is connected to a wireless data link and/or cellular telephone transceiver 195 coupled to the processor 191. In some implementations, the transceiver 195 and portions of the processor 191 and memory 192 used for cellular telephone communications are collectively referred to as the air interface since it provides a data interface via a wireless data link. Additionally, the mobile device 130 will include a close range communications (CRC) transceiver 193 (e.g., an NFC protocol transceiver) which may be connected to the antenna 194 (or include its own antenna) that is capable of establishing and communicating over a close range communications link. For example, the CRC transceiver 193 may be an NFC protocol transceiver supporting one or more of the near field communication protocols. Alternatively, the CRC transceiver 193 may be any of a variety of close range wireless communication protocol transceivers including, but not limited to, WiFi, Bluetooth® (which communicates using the 2.4 GHz frequency band), UWB (Ultra Wideband), IEEE 802.15.4, and Zigbee®.

The processor 191 may be any programmable microprocessor, microcomputer or multiple processor chip or chips that can be configured by software instructions (applications) to perform a variety of functions, including the functions of the various embodiments described herein. In some mobile devices, multiple processors 191 may be provided, such as one processor dedicated to wireless communication functions and one processor dedicated to running other applications. Typically, software applications may be stored in the internal memory 192 before they are accessed and loaded into the processor 191. In some mobile devices, the processor 191 may include internal memory sufficient to store the application software instructions. In some mobile devices, additional memory chips (e.g., a Secure Data (SD) card) may be plugged into the device 130 and coupled to the processor 191. For the purposes of this description, the term memory refers to all memory accessible by the processor 191, including internal memory 192, removable memory plugged into the mobile device, and memory within the processor 191 itself. In many mobile devices, the memory 192 may be a volatile or non-volatile memory, such as flash memory, or a mixture of both. Mobile devices typically include a key pad 13 or miniature keyboard and menu selection buttons or rocker switches 12 for receiving user inputs. Additionally, mobile devices may also include a speaker 18 to produce audible sound and a microphone 19 for sensing sound, such as receiving the speech of a user. Both the microphone 19 and speaker 18 may be connected to the processor 191 via a vocoder 199 which transforms analog electrical signals received from the microphone 19 into digital codes, and transforms digital codes received from the processor 191 into analog electrical signals which the speaker 18 can transform into sound waves. In some implementations, the vocoder 199 may be included as part of the circuitry and programming of the processor 191.

The embodiments include a personal article 105 which houses a SIM card 180 storing provisioning data and a CRC transceiver 189 for transmitting the provisioning data to one or more mobile devices. The personal article 105 may take a variety of forms. For example, the personal article may be in the form of a wristwatch, as depicted in FIG. 1. Alternatively, the personal article 105 may be included in a piece of decorative jewelry such as a bracelet, necklace, brooch, ring or belt buckle.

Figure 3:
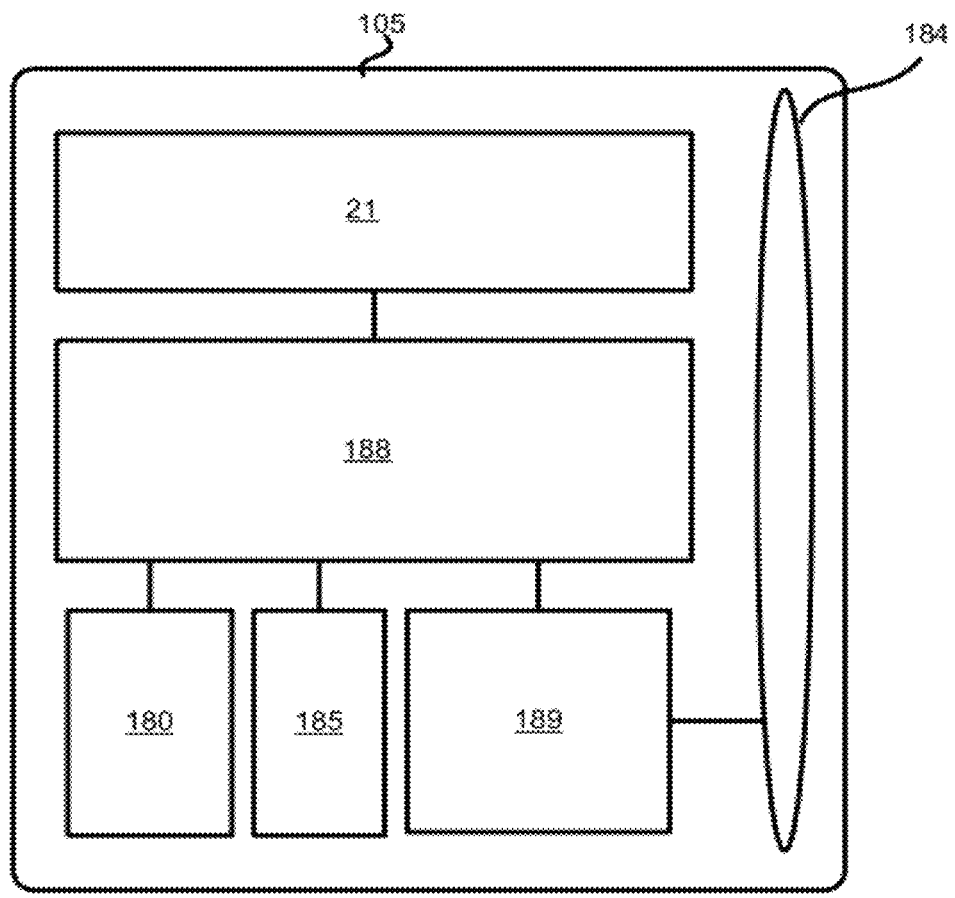
FIG. 3 is a circuit block diagram of an example personal article suitable for use with the various embodiments.

Typically, a personal article 105 will have in common the components illustrated in FIG. 3. The personal article 105 may include a processor 188 coupled to a SIM card 180. As mentioned many times above, the SIM card has stored therein provisioning data required by mobile devices 130, 140, 150, 160 to support a wireless digital communication call over a service provider's communication network. The processor 188 is coupled to a CRC transceiver 189 (e.g., an NFC protocol transceiver) which may be connected to the antenna 184 that is capable of establishing and communicating over a close range communications link. For example, the CRC transceiver 189 may be an NFC protocol transceiver supporting one or more of the near field communication protocols. Alternatively, the CRC transceiver 189 may be any of a variety of close range wireless communication protocol transceivers including, but not limited to, WiFi, Bluetooth® (which communicates using the 2.4 GHz frequency band), UWB (Ultra Wideband), IEEE 802.15.4, and Zigbee®. The antenna 184 may be housed internally to the personal article 105 so that it may be concealed in embodiments where the personal article 105 takes the form of a decorative piece of jewelry. The personal article 105 may also include a battery 21 for powering the CRC transceiver 189 and the processor 188 (if a separate processor is included). In implementations which utilize RFID technology a rectifier (not shown) coupled to the antenna 184 may be provided instead of a battery 21 in order to obtain power from an RFID interrogation signal transmitted by the mobile device CRC transceiver 193 as is well known in the RFID technology arts. In some personal articles 105, such as a digital wrist watch, a display (not shown) may be coupled to the processor 188. A display is not implemented in embodiments where the personal article 105 takes the form of a piece of jewelry. In addition, the personal article 105 may include an internal memory 185 coupled to the processor 188. The internal memory 185 may contain data such as an authentication credential template that is compared to an authentication credential received from a mobile device 130, 140, 150, 160. Based on this comparison, the personal article processor 188 may elect to download or not download the provisioning data stored in the SIM card. The internal memory 185 is optional and the SIM card 180 may provide all of the memory used by the processor 188.

As with the processor of the mobile device 130, the processor 188 utilized in the personal article 105 may be any programmable microprocessor, microcomputer or multiple processor chip or chips that can be configured by software instructions (applications) to perform a variety of functions, including the functions of the various embodiments described herein. Additionally, the processor 188 may be included within or as part of the CRC transceiver 189. In such an embodiment, the CRC transceiver 189 is configured to establish a CRC link with a mobile device 130, 140, 150, 160 and then download the provisioning data stored within the SIM card 180. Thus, in an embodiment, the personal article 105 contains only a SIM card 180 coupled to a CRC transceiver 189 which is coupled to an antenna 184 and either a small battery or a rectifier circuit coupled to the antenna 184. So configured, the electronics within the personal article 105 can be made quite small which enables the personal article 105 to be in a small item of jewelry, such as a ring or necklace.

While the protocols and methods for conducting wireless digital communications to/from a mobile device 130, 140, 150, 160 and a base station 170 using provisioning data stored on a SIM card are well known, the various embodiments provide new mechanisms for providing the necessary provisioning data stored in a single SIM card to multiple mobile devices. By storing the provisioning data in SIM card housed in a personal article 105 and adding close range communication transceivers to the mobile devices 130, 140, 150, 160, the proximity limitation of such transceivers is leveraged to provide the necessary provisioning data to only those mobile devices held by a user.

Figure 4A:
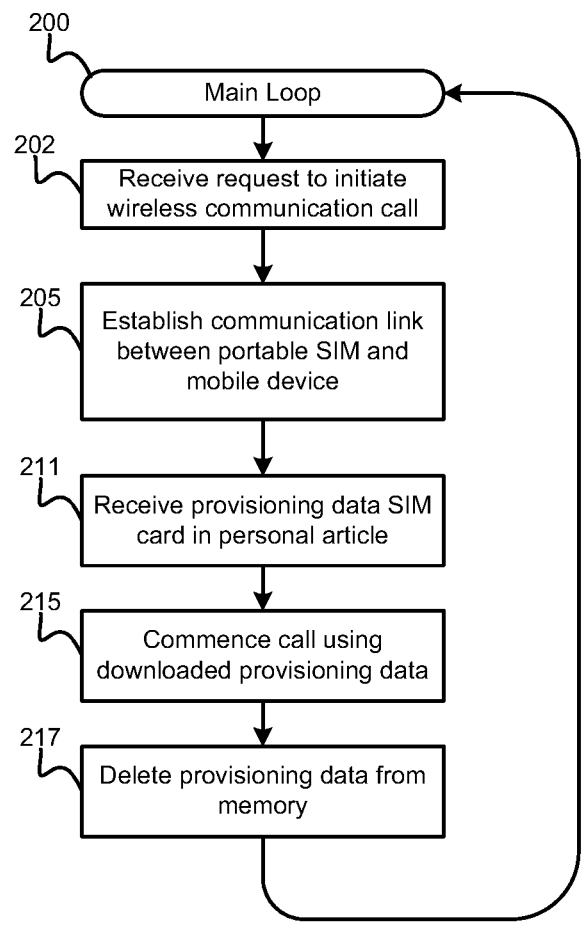
FIGS. 4A and 4B are process flow diagrams of example method steps that may be performed by a mobile device to receive provisioning data from a personal article.

FIG. 4A is a process flow diagram illustrating example method steps that may be performed by the mobile device to receive provisioning data to access a wireless communication network. In this embodiment, provisioning data is downloaded from the SIM card 180 within the personal article 105 by a mobile device 130, 140, 150, 160 each time a wireless data or telephone call is to be made. This embodiment may be implemented as part of a processor 191 main loop routine 201. A main loop routine 201 may be used to control the various applications and functions of the mobile device 130, 140, 150, 160. At any time during the running of the main loop

201, the mobile device processor 191 may receive a request to initiate a wireless digital communication call, step 202. When the request to initiate wireless digital communication is received, the mobile device processor 191 attempts to establish a close range communication link with the personal article 105 in order to download the provisioning data stored on the SIM card, step 205. The close range communication link may be established using the CRC transceiver 193 by bringing the mobile device 130 into close proximity with the personal article 105. When two CRC transceivers 193, 189 that comply with an NFC protocol are brought within communication range (within approximately 8 inches) a wireless data link is automatically established by the transceivers exchanging handshaking messages, as described in more detail below with reference to FIG. 6. Once a close range communication link has been established between the mobile device 130 and personal article 105, the personal article CRC transmitter 189 begins transmitting the provisioning data stored on the SIM card 180 over the link to the mobile device processor 191 which stores the provisioning data into memory, such as a temporary memory buffer, step 211. Once the provisioning data has been successfully downloaded, the mobile device 130, 140, 150, 160 can initiate the requested wireless digital communication call, step 215. In this embodiment, the mobile device 130, 140, 150, 160 temporarily stores the downloaded provisioning data. Once the call is commenced or completed, the provisioning data may be deleted from memory, step 217. After the call is completed the mobile device processor 191 returns to the main loop 201 to await the next call request.

In this manner, the mobile device 130, 140, 150, 160 will only be able to conduct a wireless digital communication call when it is in range of the user's personal article 105. Thus, if users lose or have their mobile device 130, 140, 150, 160 stolen, they do not have to terminate the service provider contract associated with the provisioning data stored on the SIM card. When the mobile device 130, 140, 150, 160 is missing, users do not have to worry about unauthorized charges or communication calls being initiated on the users' service account. In addition, in order to secure the provisioning data from unauthorized downloads, the effective range of the close range communication protocol may be controlled such that only devices within a limited range may establish a close range communication link with the personal article 105. By insuring that only authorized mobile devices 130, 140, 150, 160 come within the effective range of the close range communication protocol, a user may insure against fraudulent downloads of the provisioning data stored on the SIM card housed in the personal article 105. Since the personal article 105 may be worn on the user's body, the user need only insure that only authorized mobile devices 130, 140, 150, 160 come near the user's body.

Figure 4B:
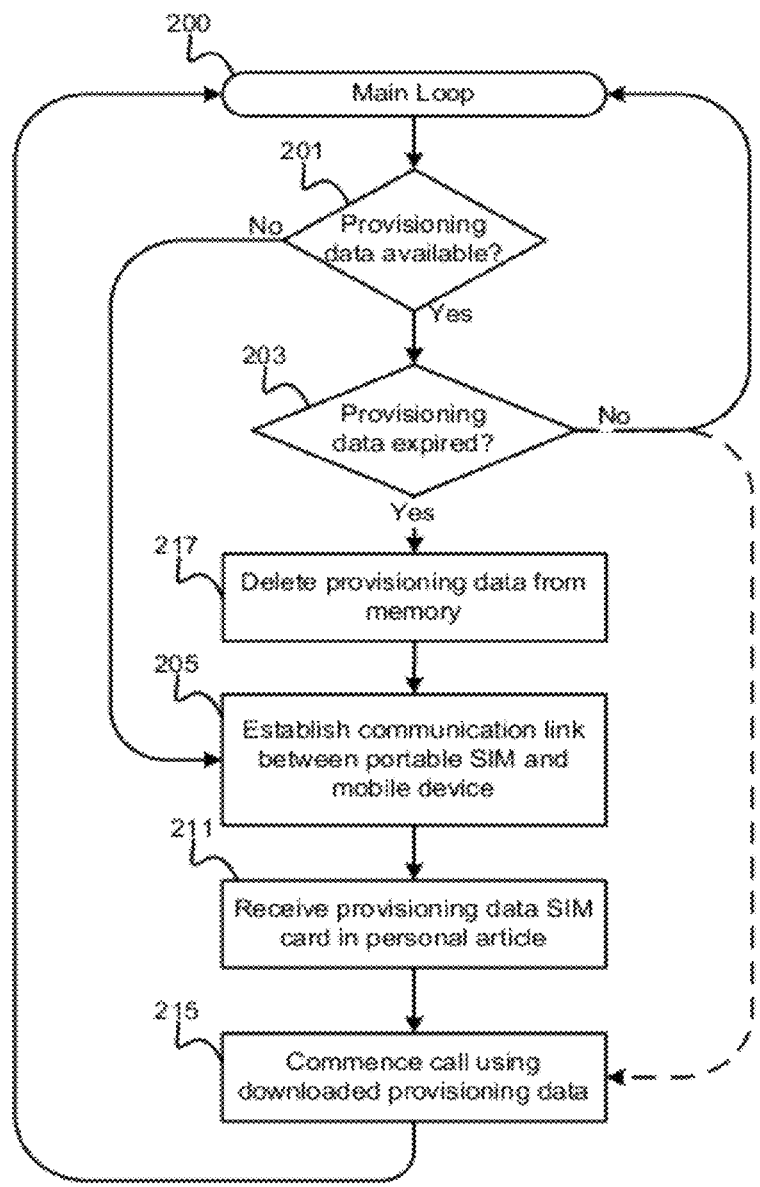

FIG. 4B illustrates an alternative process flow of example method steps that may be performed by the mobile device 130 and the personal article 105 to convey provisioning data to mobile device 130. In the alternative embodiment the mobile device 130 may store the provisioning data to a memory 192 for a pre-determined period of time. When that period of time has elapsed, the mobile device must refresh the provisioning data. In this manner, the personal article 105 will not be disturbed each time a mobile device (e.g., 130) attempts to initiate a communication call. By doing so, the battery life of the personal article 105 may be greatly extended. In addition, the user may be protected against limitless fraudulent communication call charges when the mobile device is lost or stolen. By setting the refresh period sufficiently short (e.g., hourly or daily), the user can insure that limitless unauthorized communication calls will not be made on the user's service account.

As described above with reference to FIG. 4A, at any time during the running of the main loop 201, the mobile device processor 191 may receive a request to initiate a wireless digital communication call. Alternatively, the mobile device 130 may periodically check to determine if it has provisioning data stored in memory, decision 201. If there is no provisioning data stored in memory (i.e., decision 201 ="No"), the processor 191 attempts to obtain provisioning data from the user's personal article by establishing a communication link with the personal article 105, step 205, and download the provisioning data, step 211, as described above with reference to FIG. 4A. If there is provisioning data stored in memory (i.e., decision 201="Yes"), the processor 191 determines whether the provisioning data stored in memory 192 is still valid, decision 203. If the provisioning data stored in a memory 192 is still valid and not expired (i.e., decision 203="No"), then the processor 191 either returns to the main loop 201 or proceeds to commence a data call. In instances where the provisioning data was evaluated in response to a request to place a wireless digital communication, the mobile device 130 may conduct the wireless digital communication call using the provisioning data stored in the memory 192, step 215. In instances, where the provisioning data was evaluated periodically, the processor 191 may simply return to the main loop 201. If, however, the provisioning data stored in memory 192 has expired (i.e., decision 203="Yes"), then the processor 191 deletes the provisioning data from memory to minimize the risk of unauthorized use, step 217, and attempts to establish a communication link with the SIM card housed in the personal article 105, step 205. Once a close range communication link has been established between the mobile device 130 and personal article 105, the mobile device 130 receives the provisioning data stored in the SIM card and stores it in memory as described above with reference to FIG. 4A, step 211. As described above, once the provisioning data has been downloaded, a wireless digital communication call may be initiated, step 215. Once, the wireless digital communication call has been commenced, the processor 191 may return to the main loop 201.

Figure 5:
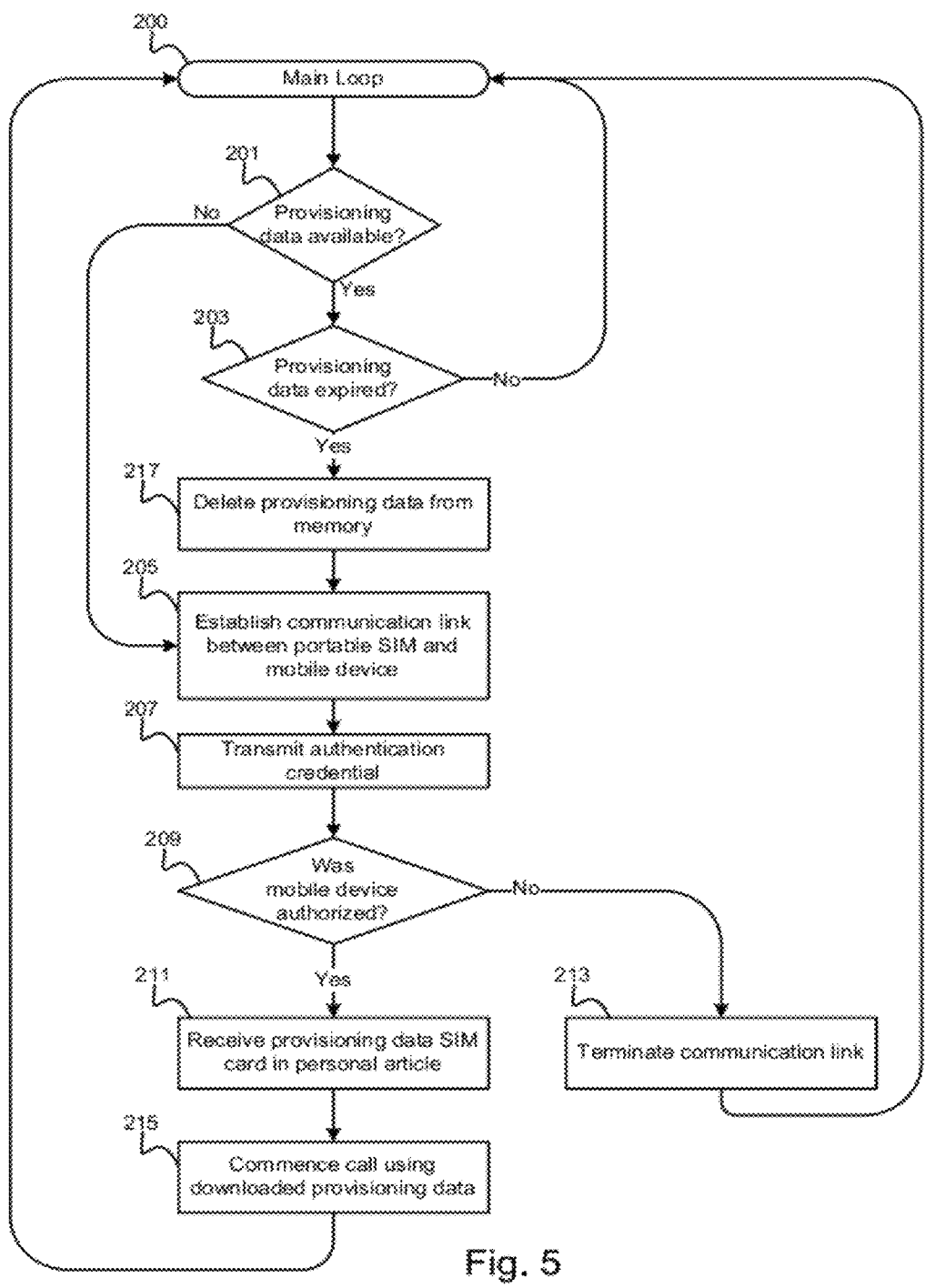
FIG. 5 is a process flow diagram of alternative method steps that may be performed by a mobile device and a personal article to transmit provisioning from a personal article.

FIG. 5 illustrates an alternative process flow of example method steps that may be performed by the mobile device 130 and the personal article 105 to convey provisioning data to mobile device 130 with added security afforded by a credential check. In addition to time-limiting the validity of the provisioning data, the alternative embodiment illustrated in FIG. 5 provides for an additional level of security against unauthorized downloads of provisioning data by requiring an authentication step between any mobile device attempting to establish a close range communication link with the personal article 105. The process steps proceed in the manner described above with reference to FIGS. 4A and 4B for like numbered steps. When the mobile device processor 191 determines that new provisioning data is needed, it attempts to establish a communication link with the personal article 105, step 205. Once a close range communication link has been established between the mobile device 130, 140, 15, 160 and the user's personal article 105, the mobile device processor 191 may transmit an authentication credential to the personal article 105 via the established link in order to authenticate itself to the personal article 105, step 207. The personal article processor 188 may receive the authentication credential and compare it with a stored authentication credential to determine whether the mobile device 130 that has established a close range communication link is authorized to receive the provisioning data stored on the SIM card, decision 209. If the personal article processor 188 determines that the mobile device 130, 140, 15, 160 is authorized to receive a provisioning data download (i.e., decision 209=Yes), then it may transmit a signal to that effect which the mobile device may receive. Thereafter, the personal article processor 188 transmits the provisioning data via the close range communication link to the mobile device 130, 140, 150, 160, which receives and stores the data in memory, step 211. If, however, the personal article processor 188 determines that the mobile device 130, 140, 15, 160 is not authorized to receive the provisioning data (i.e., decision 209="No"), the mobile device 230 may receive an indication as such back from the personal article 105 and the close range communication link may be terminated, step 213. Once the link is terminated, the mobile device processor 191 returns to the main loop 201.

Figure 6:
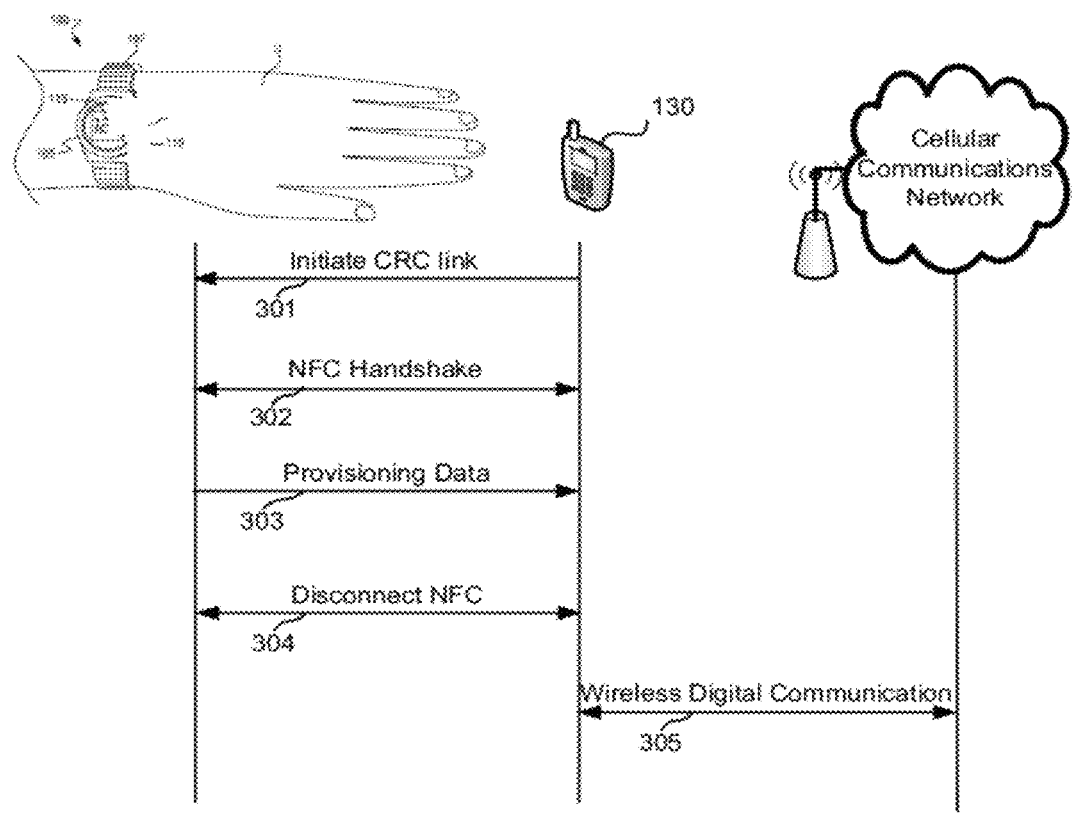
FIG. 6 is a message flow diagram of the embodiment method illustrated in FIG. 4.

FIG. 6 provides an overview of basic communications that may occur between the personal article 105, mobile device 130, 140, 15, 160 and a cellular communications network 118 in the embodiment method depicted in FIGS. 4A, 4B and 5. The mobile device (e.g., 130) may initiate a close range communication link by sending a message defined by the implemented protocol which the personal article CRC transceiver 189 can recognize, message 301. The close range communication link may be of a NFC variety in which the user brings the mobile device (e.g., 130) in close proximity to the personal article 105 or actually touches the two devices. Alternatively, the close range communication link may be established using any of a variety of protocols including, but not limited to WiFi, Bluetooth® (which communicates using the 2.4 GHz frequency band), UWB (Ultra Wideband), IEEE 802.15.4, and Zigbee.® As illustrated in FIG. 6, the close range communication link may be established by exchanging handshaking messages 302 defined in NFC protocols. Once the NFC handshake procedure is complete, the personal article 105 may transmit the provisioning data stored in its SIM card to the mobile device 130, messages 303. Once the provisioning data is downloaded to the mobile device, the NFC communication link may be disconnected by exchanging a series of messages defined in the link protocol, messages 304. Once the mobile device 130 has disconnected the close range communication link a wireless digital communication call may be conducted between the mobile device 130 and the cellular communications network 118 via a base station 170 by transmitting data contained in the provision data, messages 305.

Figure 7:
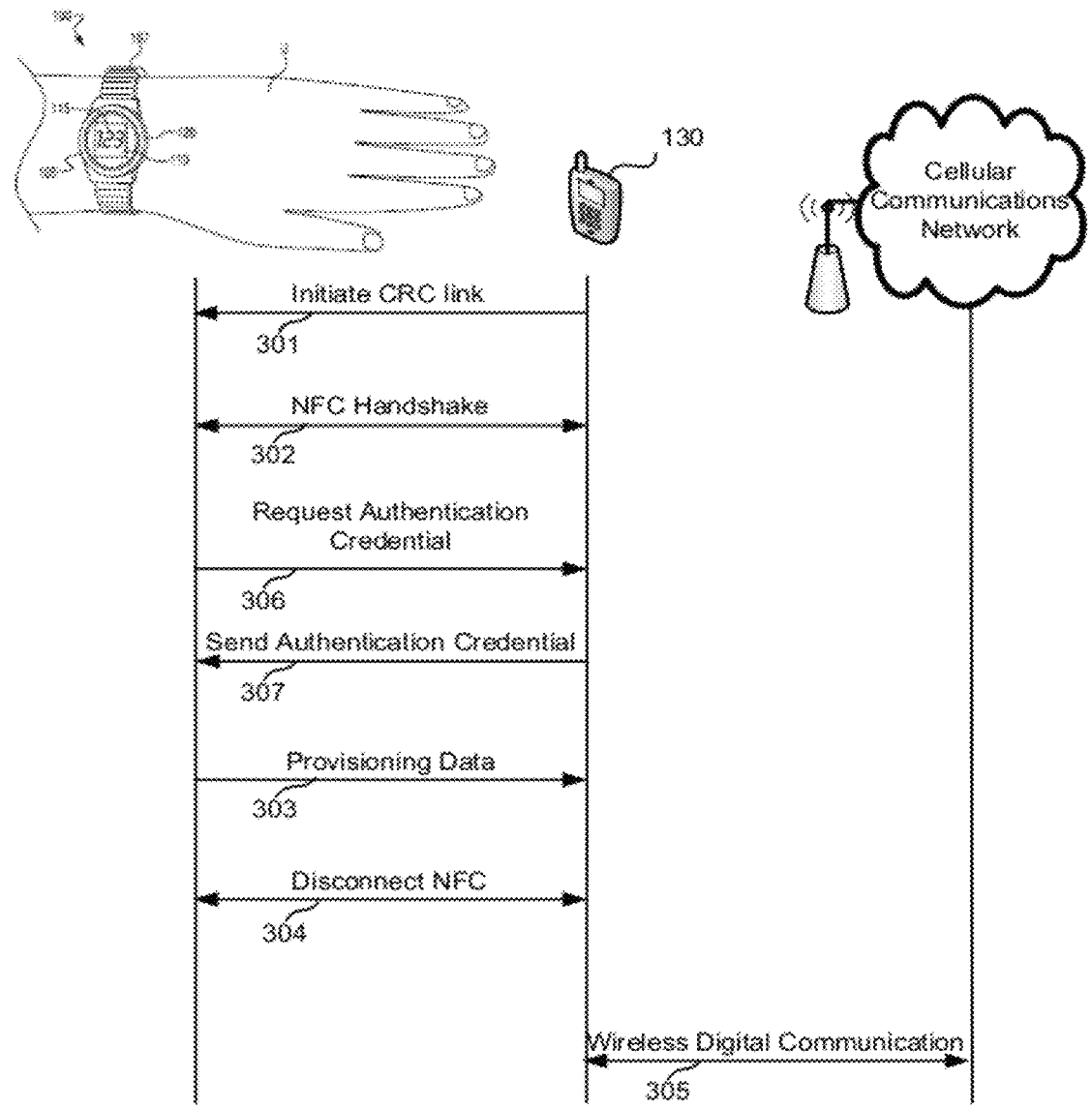
FIG. 7 is a message flow diagram of the embodiment method illustrated in FIG. 5.

FIG. 7 provides an overview of basic communications that may occur between the personal article 105, mobile device (e.g., 130) and cellular communications network 118 in the alternative embodiment method depicted in FIG. 5. The message flow depicted in FIG. 7 is substantially similar to the message flow depicted in FIG. 6. The message flow of FIG. 7 contains all of messages 301-305 described above with reference to FIG. 6. Additionally, prior to the downloading of provisioning data from the personal article 105 to the mobile device 130, the personal article 105 may request the mobile device 130 to transmit an authentication credential to insure that mobile device 130 is authorized to download the provisioning data stored on the SIM card housed within personal article 105, message 306. In response to the request for authentication credentials, the mobile device 130 may transmit the authentication credentials to the personal article 105, message 307.

Figure 8:
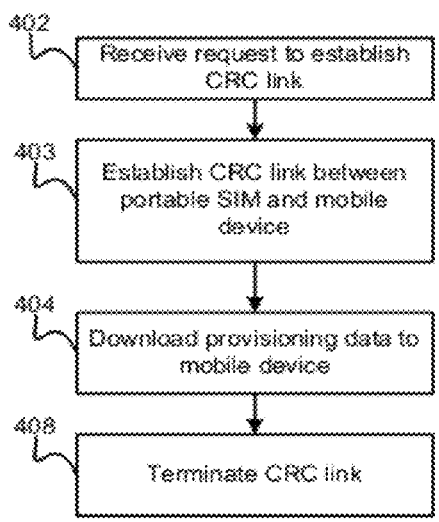
FIG. 8 is a process flow diagram of example method steps that may be performed by a personal article to transmit provisioning data to a mobile device.

FIG. 8 is a process flow diagram illustrating example method steps that may be performed by the processor 188 or the CRC transceiver 189 in a personal article 105 to transmit provisioning data stored in the SIM card 180 to one or more mobile devices. At any time the personal article processor 188 may receive a request from the CRC transceiver 189 to initiate a close range communication link with a mobile device 130, 140, 150, 160, step 402. For example, the CRC link may be established by touching the mobile device 130 and personal article 105 together to utilize a NFC protocol if the CRC transceivers 189, 194 are configured as an NFC protocol transceiver. In that case, the request to establish the close range communication link may be the reception of NFC signals from an adjacent NFC transceiver (i.e., the user has brought the two items within about eight inches of each other). Alternatively, other well known CRC protocols such as WiFi, Bluetooth® (which communicates using the 2.4 GHz frequency band), UWB (Ultra Wideband), IEEE 802.15.4, and Zigbee may be implemented to request or initiate or establish a close range communication link. In response to a request or signal to establish a close range communication link, the personal article 105 and mobile device 130, 140, 150, 160 begin exchanging appropriate handshaking messages 302 between their respective CRC transceivers 189, 193 to establish a close range communication link, step 403. Again, the nature of the handshaking messages 302 will depend upon the communication protocol being employed by the CRC transceivers 189, 193. Once a close range communication link has been established between the mobile device 130 and personal article 105, the personal article processor 188 (or the CRC transceiver 189) begins transmitting provisioning data from the SIM card 180 housed in the personal article 105 to the mobile device 130, 140, 150, 160 via the CRC transceiver, step 404. Once the data transmission is complete the personal article processor 189 or CRC transceiver 189 may terminate the close range communication link, step 408. If another mobile device 130, 140, 150, 160 is also communicating with the personal article 105 (i.e., it is also within communication range of the CRC transceiver 189), the method steps 402-408 may then be repeated to establish a close range communication link and transmit the provisioning data to the other mobile device.

Figure 9:
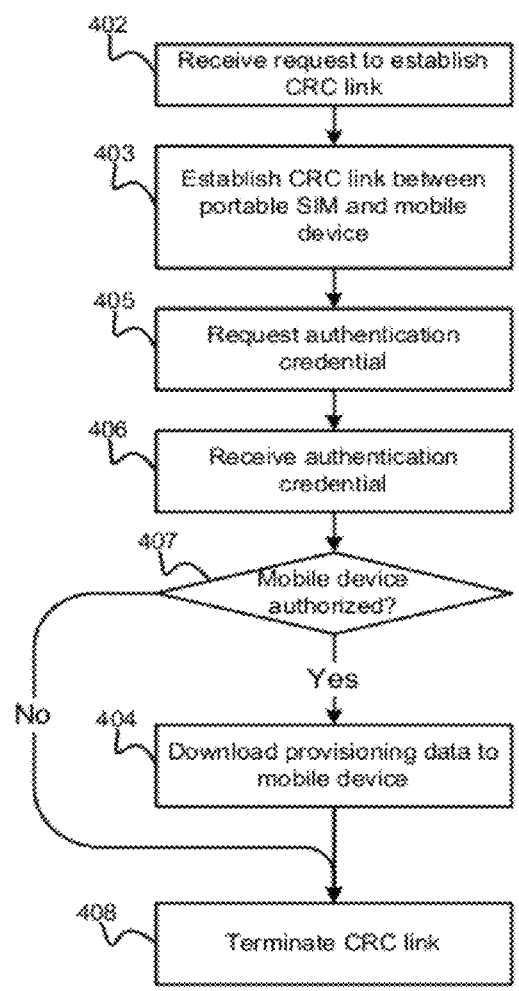
FIG. 9 is a process flow diagram of an alternative of method steps that may be performed by a personal article to transmit provisioning data to a mobile device.

FIG. 9 is a process flow diagram illustrating example method steps that may be performed by the processor 188 or the CRC transceiver 189 in a personal article 105 to transmit provisioning data stored in the SIM card 180 to one or more mobile devices 130, 140, 150, 160 consistent with the embodiment illustrated in FIG. 5. This embodiment includes the example method steps 401-403 described above with reference to the process flow diagram illustrated in FIG. 8. Once a close range communication link is established, step 403, the personal article 105, processor 188 or CRC transceiver 189 may request an authentication credential from the linked mobile device 130, 140, 150, 160, step 405. The processor 188 may then receive an authentication credential from the mobile device via the close range communication link, step 406, and compare the received credential to an authentication credential stored in internal memory 185 or 180 to determine if the mobile device is authorized to receive the provisioning data stored on the SIM card 180, decision 407. If the authentication credential received from the mobile device 130, 140, 150, 160 matches the authentication credential stored in the personal article memory 180 or 185 (i.e., decision 407="Yes"), the mobile device is deemed to be authorized and the transmission of provisioning data to the mobile device may commence over the close range communication link, step 404. Once the provisioning data transmission is complete, the close range communication link may be terminated, step 408. If, however, the authentication credential received from the mobile device 130, 140, 150, 160 does not match the authentication credential stored in memory 180 or 185 (i.e., decision 407="No"), then the mobile device is deemed not to be authorized and the close range communication link is terminated without transmitting the data, step 408. If another mobile device 130, 140, 150, 160 is also communicating with the personal article 105 (i.e., it is also within communication range of the CRC transceiver 189), the method steps 402-408 may then be repeated to establish a close range communication link and transmit the provisioning data to the other mobile device.

On occasion, a service provider may desire to update the provisioning data provided to each of its customers. For example, installation of new network equipment may broaden a service provider's network thus, obviating the need for roaming agreements with other service providers in certain areas. Alternatively, new roaming agreements may affect the preferred roaming lists (PRLs) included as part of the provisioning data. Typically, these updates may be performed for mobile communication devices through a hard wired update or through an over-the-air (OTA) procedure where the user may be asked to dial a code (e.g., *228) to initiate a data connection with the service provider's cellular communication network. Since the personal article 105 may not include a cellular network transceiver, the personal article 105 may not be able to perform an OTA provisioning update. In order to provide the personal article 105 with updates to the provisioning data, one of a user's mobile devices 130, 140, 150, 160 may receive and store an update from the service provider's server via a hardwire connection to the Internet (not shown) or an OTA update received from a cellular communication network 118. The updates may be stored in an internal memory 192 of the mobile device 130, 140, 150, 160 until the next close range communication link is established with the personal article 105. Once a close range communication link is established the updated provisioning data may be stored to the SIM card.

Figure 10:
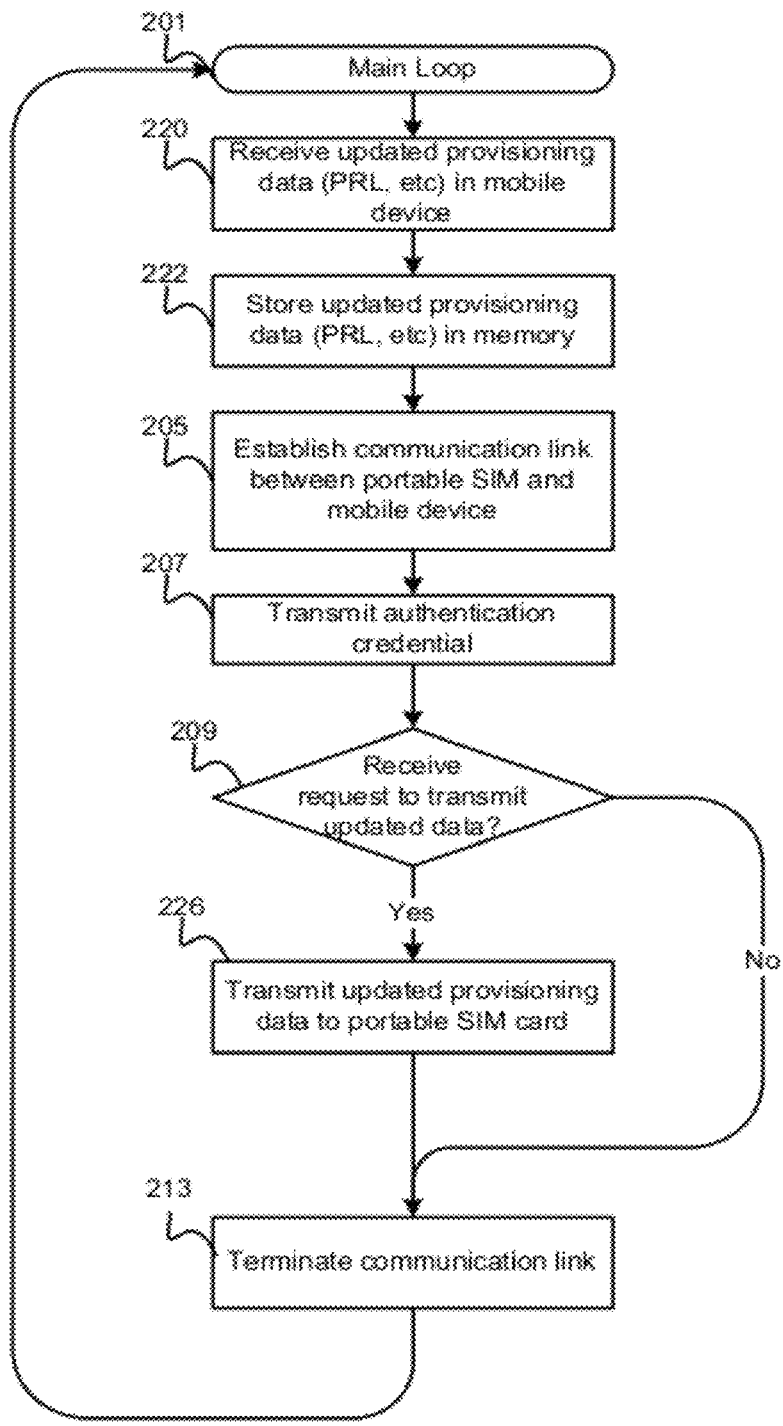
FIG. 10 is a process flow diagram of an embodiment method suitable for updating provisioning data to a SIM card housed in a personal article.

FIG. 10 is a process flow diagram illustrating example method steps that may be performed by a mobile device 130, 140, 150, 160 to update provisioning data stored in a SIM card 180 housed within a personal article 105. The provisioning data updating routine may be entered from the mobile device processor 191 main loop routine 201. At any time during the main loop 201 the mobile device processor 191 may receive an OTA update message from a service provider's server, step 220. Such OTA update messages may be received via the cellular communication network 118 in the manner currently implemented by conventional mobile devices and cellular communication service providers. Once the OTA update message has been received, the updated provisioning data is stored to memory 192 in the mobile device 130, 140, 150, 160, step 222. The next time that a close range communication link is established, step 205, the updated provisioning data is transmitted to the personal article 105 for storage on its SIM card 180, step 226. In an embodiment, the mobile device 130, 140, 150, 160 may attempt to establish a close range communication link with the personal article 105 immediately after receiving the updated provisioning data, step 205. As described above with reference to steps 207 and 209 illustrated in FIG. 5, the mobile device 130 may optionally receive a request to transmit an authentication credential to the personal article 105. Such an authentication credential can be used by the personal article processor 188 or CRC transceiver 189 to insure that the mobile device 130, 140, 150, 160 is authorized to modify the provisioning data stored in the SIM card 180 housed within the personal article 105. In response to receiving a request for an authentication credential, the mobile device 130, 140, 150, 160 may transmit its authentication credential via the close range communication link, step 207. Upon receiving the authentication credential, the personal article processor 188 or CRC transceiver 189 may compared the received credential to a credential template stored in memory 180 or 185 to determine if the mobile device is authorized. If the transmitted authentication credential matches that of the authentication credential template stored in the personal article 105 memory 180 or 185 the mobile device is deemed to be authorized and the personal article processor 188 or CRC transceiver 189 may transmit a request to the mobile device 130, 140, 150, 160 requesting transmission of the updated provisioning data which the mobile device processor 191 waits to receive, decision 209. If the mobile device 130, 140, 150, 160 receives a request for the updated provisioning data (i.e., decision 209 ="Yes"), the provisioning data stored in the mobile device memory 192 may be transmitted to the personal article 105 via the close range communication link where it is store in the SIM card 180, step 226. Once the updated provisioning data has been transmitted, the close range communication link may be terminated, step 213 and the processor 191 may return to the main loop routine 201. If, however, the mobile device 130 does not receive a request to transmit the update provisioning data (i.e., decision 209 ="No"), then the close range communication link is terminated, step 213, and the processor 191 may return to the main loop routine 201. In this manner, the personal article 105 may utilize the cellular transceiver 195 of one of the mobile devices 130, 140, 150, 160 to perform an OTA provisioning data update operation.

In an embodiment, the optional steps of transmitting an authentication credential and authenticating a mobile device (step 207 and decision 209) may be omitted in favor of simply insuring that only authorized devices come within the effective range of the personal article CRC transceiver 189.

The various embodiments disclosed herein provide a user with a convenient method and apparatus to implement a single set provisioning data stored in a single SIM card on multiple mobile devices. The various embodiments allow a user to maintain a single service provider account while providing the necessary provisioning data to a multitude of mobile devices without the need to physically interchange a SIM card from one device to another. In addition, the embodiments allow a user to utilize any mobile device to complete a wireless digital communication through the user's own account. For example, if a user's mobile device has been lost or stolen, the user may borrow another mobile device and conduct wireless digital communication calls by provisioning the borrowed mobile device via a CRC transceiver 189 in the user's personal article 105. Because the mobile device 130, 140, 150, 160 must be within the effective communication range of the CRC transceiver 189, a user can insure that no unauthorized calls are made using the user's service account on a lost or stolen mobile device.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method for provisioning a mobile device, comprising:
   establishing a close range communication link between the mobile device and a personal article containing a SIM card, wherein said close range communication link is limited by transmitter power or round-trip communication delay to a range of less than about one meter and the personal article is an article worn on a user's body selected from the group consisting of wristwatches and decorative jewelry;
   receiving via the established close range communication link provisioning data stored in the SIM card, wherein validity of the provisioning data is time-limited; and
   terminating the close range communication link upon completing reception of the provisioning data.

2. The method of claim 1, further comprising establishing a second communication link between the mobile device and a wireless communication network using the received provisioning data.

3. The method of claim 1, further comprising:
   transmitting an authentication credential from the mobile device to the personal article via the established close range communication, the authentication credential having a content to enable the personal article to authenticate the mobile device as authorized to receive the provisioning data stored on the SIM card.

4. The method of claim 1, wherein the close range communications link is limited to a range of approximately 0-20 cm and utilizes a near field communication (NFC) protocol.

5. The method of claim 1, wherein the close range communications link utilizes a BlueTooth® communication protocol.

6. The method of claim 2, wherein the second communication link is established to make a wireless data communication call, and further comprising:
   storing the received provisioning data to memory; and
   deleting the provisioning data from memory once the wireless data communication call is completed.

7. The method of claim 1, further comprising:
   storing the received provisioning data to memory;
   determining whether provisioning data stored in memory has expired based on the time-limited validity; and
   deleting the provisioning data from memory if it is determined that the provisioning data stored in memory has expired.

8. A method for updating provisioning data stored on a SIM card housed within a personal article, comprising:
   receiving updated provisioning data on a mobile device via a cellular communication network;
   storing the received updated provisioning data in memory;
   establishing a close range communications link between the mobile device and the personal article, wherein said close range communication link is limited by transmitter power or round-trip communication delay to a range of less than about one meter and the personal article is an article worn on a user's body selected from the group consisting of wristwatches and decorative jewelry;
   transmitting the received updated provisioning data to the personal article via the close range communications link for storage in the SIM card; and
   terminating the close range communication link upon completing transmission of the updated provisioning data.

9. The method of claim 8, further comprising:
   transmitting an authentication credential from the mobile device to the personal article, the authentication credential having a content to enable the personal article to authenticate the mobile device as being authorized to transmit the updated provisioning data to the personal article.

10. The method of claim 8, wherein the close range communications link is limited to a range of approximately 0-20 cm and utilizes a near field communication (NFC) protocol.

11. The method of claim 8, wherein the close range communications link utilizes a BlueTooth® communication protocol.

12. A method for providing provisioning data stored in a SIM card within a personal article to a mobile device, comprising:
    establishing a close range communication link between the personal article and the mobile device, wherein said close range communication link is limited by transmitter power or round-trip communication delay to a range of less than about one meter and the personal article is an article worn on a user's body selected from the group consisting of wristwatches and decorative jewelry;
    transmitting the provisioning data stored in the SIM card to the mobile device via the established close range communication link, wherein validity of the provisioning data is time-limited; and
    terminating the close range communication link upon completing transmission of the provisioning data.

13. The method of claim 11, further comprising:
    receiving an authentication credential from the mobile device; and
    authenticating the mobile device using the received authentication credential,
    wherein the step of transmitting the provisioning data stored in the SIM card to the mobile device is performed only if the mobile device is authenticated.

14. The method of claim 13, further comprising requesting the authentication credential from the mobile device.

15. A method for updating providing provisioning data stored in a SIM card within a personal article, comprising:
    establishing a close range communication link between the personal article and a mobile device, wherein said close range communication link is limited by transmitter power or round-trip communication delay to a range of less than about one meter and the personal article is an article worn on a user's body selected from the group consisting of wristwatches and decorative jewelry;
    receiving updated provisioning data from the mobile device via the established close range communication link;
    terminating the close range communication link upon completing reception of the updated provisioning data; and
    storing the received updated provisioning data in the SIM card within the personal article.

16. The method of claim 14, further comprising:
    receiving an authentication credential from the mobile device; and
    authenticating the mobile device using the received authentication credential,
    wherein the step of storing the received updated provisioning data in the SIM card is performed only if the mobile device is authenticated.

17. The method of claim 16, further comprising requesting the authentication credential from the mobile device.

18. A mobile device, comprising:
    a processor;
    a first transceiver coupled to the processor;
    a second transceiver coupled to the processor, the second transceiver being a close range communication transceiver; and
    a memory coupled to the processor;
    wherein the processor is configured with software instructions to perform steps comprising:
        establishing a close range communications link via the second transceiver with a personal article worn on a user's body selected from the group consisting of wristwatches and decorative jewelry, wherein said close range communication link is limited by transmitter power or round-trip communication delay to a range of less than about one meter;
        receiving provisioning data from the personal article via the close range communications link, wherein validity of the provisioning data is time-limited; and
        terminating the close range communication link upon completing reception of the provisioning data.

19. The mobile device of claim 18, wherein the processor is configured with software instructions to perform steps further comprising conducting a wireless digital communication call via the first transceiver using the received provisioning data.

20. The mobile device of claim 18, wherein the mobile device processor is configured with software instructions to perform steps further comprising transmitting an authentication credential to the personal article.

21. The mobile device of claim 18, wherein the second transceiver is a near field communication (NFC) protocol transceiver with a limited range of approximately 0-20 cm.

22. The mobile device of claim 18, wherein the second transceiver is a BlueTooth® protocol transceiver.

23. The mobile device of claim 18, wherein the mobile device processor is configured with software instructions to perform steps further comprising:
    receiving updated provisioning data via the first transceiver;
    storing the received updated provisioning data in the memory;
    establishing a second close range communication link with the personal article that is limited by transmitter power or round-trip communication delay to a range of less than about one meter; and
    transmitting the received updated provisioning data to the personal article via the second close range communications link.

24. The mobile device of claim 23, wherein the mobile device processor is configured with software instructions to perform steps further comprising:
    transmitting an authentication credential to the personal article via the second close range communication link prior to transmitting the updated provisioning data.

25. The mobile device of claim 18, wherein the processor is configured with software instruction to perform steps further comprising deleting the provisioning data from memory once the wireless data communication call is completed.

26. The mobile device of claim 18, wherein the processor is configured with software instruction to perform steps further comprising:
    storing the received provisioning data in the memory;
    determining whether the provisioning data stored in the memory has expired based on the time-limited validity; and
    deleting the provisioning data from memory if it is determined that the provisioning data stored in memory has expired.

27. A personal article, comprising:
    a body-worn article selected from the group consisting of wristwatches and decorative jewelry;
    a processor within the body-worn article;
    a SIM card coupled to the processor, wherein the SIM card has stored therein provisioning data for a cellular communications network; and
    a close range communication transceiver coupled to the processor,
    wherein the processor is configured with software instructions to perform steps comprising:

establishing a close range communications link with a mobile device, wherein said close range communication link is limited by transmitter power or round-trip communication delay to a range of less than about one meter;

transmitting the provisioning data stored within the SIM card to the mobile device via the established close range communications link, wherein validity of the provisioning data is time-limited; and terminating the close range communication link upon completing transmission of the provisioning data.

28. The personal article of claim 27, further comprising a memory coupled to the processor having stored therein an authentication credential template, wherein the processor is configured with software instructions to perform steps further comprising:

receiving an authentication credential from the mobile device; and comparing the received authentication credential to the authentication credential template stored in memory to authenticate the mobile device, and wherein the step of transmitting the provisioning data stored within the SIM card to the mobile device is performed only if the mobile device is authenticated.

29. The personal article of claim 27, wherein the personal article is a wristwatch.

30. The personal article of claim 27, wherein the personal article is an item of decorative jewelry selected from the group consisting of a bracelet, a necklace, a brooch, a ring and a belt buckle.

31. The personal article of claim 28, wherein the processor is configured with software instructions to perform steps further comprising terminating the close range communications link prior to transmitting the provisioning data stored on the SIM card if the mobile device is not authenticated.

32. The personal article of claim 27, wherein the close range communications transceiver is a near field communication protocol transceiver with a range of approximately 0-20 cm.

33. The personal article of claim 27, wherein the close range communication transceiver is a BlueTooth® transceiver.

34. The personal article of claim 27, wherein the processor is configured with software instructions to perform steps further comprising:

receiving updated provisioning data from the mobile device via the close range communications link; and storing the received updated provisioning data in the SIM card.

35. The personal article of claim 34, further comprising a memory coupled to the processor having stored therein an authentication credential template, wherein the processor is configured with software instructions to perform steps further comprising:

receiving an authentication credential from the mobile device; and comparing the received authentication credential to the authentication credential template stored in memory to authenticate the mobile device, wherein the step of storing the received updated provisioning data in the SIM card is performed only if the mobile device is authenticated.

36. The personal article of claim 35, wherein the processor is configured with software instructions to perform steps further comprising terminating the close range communications link prior to receiving the updated provisioning data if the mobile device is not authenticated.

37. A mobile device, comprising:

means for establishing a close range communication link between the mobile device and a personal article containing a SIM card, wherein said close range communication link is limited by transmitter power or round-trip communication delay to a range of less than about one meter and the personal article is an article worn on a user's body selected from the group consisting of wristwatches and decorative jewelry;

means for receiving via the established close range communication link provisioning data stored in the SIM card, wherein validity of the provisioning data is time-limited; and means for terminating the close range communication link upon completing reception of the provisioning data.

38. The mobile device of claim 37, further comprising means for establishing a second communication link between the mobile device and a wireless communication network using the received provisioning data.

39. The mobile device of claim 37, further comprising:

means for transmitting an authentication credential from the mobile device to the personal article via the established close range communication, the authentication credential having a content to enable the personal article to authenticate the mobile device as authorized to receive the provisioning data stored on the SIM card.

40. The mobile device of claim 37, wherein the means for establishing a close range communication link is limited to a range of approximately 0-20 cm and utilizes a near field communication (NFC) protocol.

41. The mobile device of claim 37, wherein the means for establishing a close range communication link utilizes a BlueTooth® communication protocol.

42. The mobile device of claim 38, wherein the second communication link is established to make a wireless data communication call, and further comprising:

means for storing the received provisioning data to memory; and means for deleting the provisioning data from memory once the wireless data communication call is completed.

43. The mobile device of claim 37, further comprising:

means for storing the received provisioning data to memory;

means for determining whether provisioning data stored in memory has expired based on the time-limited validity; and means for deleting the provisioning data from memory if it is determined that the provisioning data stored in memory has expired.

44. A mobile device comprising:

means for receiving updated provisioning data via a cellular communication network;

means for storing the updated provisioning data in memory;

means for establishing a close range communications link between the mobile device and a personal article, wherein said close range communication link is limited by transmitter power or round-trip communication delay to a range of less than about one meter and the personal article is an article worn on a user's body selected from the group consisting of wristwatches and decorative jewelry;

means for transmitting the received updated provisioning data to the personal article via the close range communications link for storage in a SIM card housed within the personal article; and means for terminating the close range communication link upon completing transmission of the updated provisioning data.

45. The mobile device of claim 44, further comprising means for transmitting an authentication credential from the mobile device to the personal article, the authentication credential having a content to enable the personal article to authenticate the mobile device as being authorized to transmit the updated provisioning data to the personal article.

46. The mobile device of claim 44, wherein the means for establishing a close range communications link is limited to a range of approximately 0-20 cm and utilizes a near field communication (NFC) protocol.

47. The method of claim 44, wherein the means for establishing close range communications link utilizes a Blue-Tooth® communication protocol.

48. A personal article, comprising:
a body-worn article selected from the group consisting of wristwatches and decorative jewelry;
means for establishing a close range communication link between the personal article and a mobile device, wherein said close range communication link is limited by transmitter power or round-trip communication delay to a range of less than about one meter;
means for transmitting provisioning data stored in a SIM card housed within the personal article to the mobile device via the established close range communication link, wherein validity of the provisioning data is time-limited; and
means for terminating the close range communication link upon completing transmission of the provisioning data.

49. The personal article of claim 48, further comprising:
means for receiving an authentication credential from the mobile device;
means for authenticating the mobile device using the received authentication credential; and
means for terminating the close range communication link between the personal article and a mobile device if the mobile device is not authenticated.

50. The personal article of claim 49, further comprising means for requesting the authentication credential from the mobile device.

51. A personal article, comprising:
a body-worn personal article selected from the group consisting of wristwatches and decorative jewelry;
means for establishing a close range communication link between the personal article and a mobile device, wherein said close range communication link is limited by transmitter power or round-trip communication delay to a range of less than about one meter;
means for receiving updated provisioning data from the mobile device via the established close range communication link;
means for terminating the close range communication link upon completing reception of the updated provisioning data; and
means for storing the received updated provisioning data in a SIM card housed within the personal article.

52. The personal article of claim 51, further comprising:
means for receiving an authentication credential from the mobile device;
means for authenticating the mobile device using the received authentication credential; and
means for terminating the close range communication link between the personal article and the mobile device if the mobile device is not authenticated.

53. The personal article of claim 52, further comprising means for requesting the authentication credential from the mobile device.

54. A non-transitory storage medium having stored thereon processor-executable software instructions configured to cause a processor of a mobile device to perform steps comprising:
establishing a close range communication link between the mobile device and a personal article containing a SIM card, wherein said close range communication link is limited by transmitter power or round-trip communication delay to a range of less than about one meter and the personal article is an article worn on a user's body selected from the group consisting of wristwatches and decorative jewelry;
receiving via the established close range communication link provisioning data stored in the SIM card, wherein validity of the provisioning data is time-limited; and
terminating the close range communication link upon completing reception of the provisioning data.

55. The non-transitory storage medium of claim 54, wherein the stored processor-executable software instructions are configured to cause a processor to perform further steps comprising establishing a second communication link between the mobile device and a wireless communication network using the received provisioning data.

56. The non-transitory storage medium of claim 54, wherein the stored processor-executable software instructions are configured to cause a processor to perform further steps comprising:
transmitting an authentication credential from the mobile device to the personal article via the established close range communication, the authentication credential having a content to enable the personal article to authenticate the mobile device as authorized to receive the provisioning data stored on the SIM card.

57. The non-transitory storage medium of claim 54, wherein the stored processor-executable software instructions are configured to cause a processor to perform further steps comprising establishing the close range communication link limited to a range of approximately 0-20 cm using a near field communication (NFC) protocol.

58. The non-transitory storage medium of claim 54, wherein the stored processor-executable software instructions are configured to cause a processor to perform further steps comprising establishing the close range communication link using a BlueTooth® communication protocol.

59. The non-transitory storage medium of claim 54, wherein the second communication link is established to make a wireless data communication call, and the stored processor-executable software instructions are configured to cause a processor to perform further steps comprising:
storing the received provisioning data to memory; and
deleting the provisioning data from memory once the wireless data communication call is completed.

60. The non-transitory storage medium of claim 54, wherein the stored processor-executable software instructions are configured to cause a processor to perform further steps comprising:
storing the received provisioning data to memory;
determining whether provisioning data stored in memory has expired based on the time-limited validity; and deleting the provisioning data from memory if it is determined that the provisioning data stored in memory has expired.

61. A non-transitory storage medium having stored thereon processor-executable software instructions configured to cause a processor of a mobile device to perform steps comprising:
receiving updated provisioning data on the mobile device via a cellular communication network;
storing the received updated provisioning data in memory;
establishing a close range communications link between the mobile device and a personal article, wherein said close range communication link is limited by transmitter power or round-trip communication delay to a range of less than about one meter and the personal article is an article worn on a user's body selected from the group consisting of wristwatches and decorative jewelry;
transmitting the received updated provisioning data to the personal article via the close range communications link for storage in a SIM card housed within the personal article; and
terminating the close range communication link upon completing transmission of the provisioning data.

62. The non-transitory storage medium of claim 61, wherein the stored processor-executable software instructions are configured to cause a processor to perform further steps comprising:
transmitting an authentication credential from the mobile device to the personal article, the authentication credential having a content to enable the personal article to authenticate the mobile device as being authorized to transmit the updated provisioning data to the personal article.

63. The non-transitory storage medium of claim 61, wherein the stored processor-executable software instructions are configured to cause a processor to perform further steps comprising establishing the close range communications link limited to a range of approximately 0-20 cm using a near field communication (NFC) protocol.

64. The non-transitory storage medium of claim 61, wherein the stored processor-executable software instructions are configured to cause a processor to perform further steps comprising establishing the close range communications link using a BlueTooth® communication protocol.

65. A non-transitory storage medium having stored thereon processor-executable software instructions configured to cause a processor of a personal article to perform steps comprising:
establishing a close range communication link between the personal article and a mobile device, wherein said close range communication link is limited by transmitter power or round-trip communication delay to a range of less than about one meter and the personal article is an article worn on a user's body selected from the group consisting of wristwatches and decorative jewelry;
transmitting the provisioning data stored in a SIM card housed within the personal article to the mobile device via the established close range communication link, wherein validity of the provisioning data is time-limited; and
terminating the close range communication link upon completing transmission of the provisioning data.

66. The non-transitory storage medium of claim 65, wherein the stored processor-executable software instructions are configured to cause a processor to perform further steps comprising:
receiving an authentication credential from the mobile device;
authenticating the mobile device using the received authentication credential; and
terminating the close range communication link prior to transmitting the provisioning data stored in the SIM card to the mobile device if the mobile device is not authenticated.

67. The non-transitory storage medium of claim 66, wherein the stored processor-executable software instructions are configured to cause a processor to perform further steps comprising requesting the authentication credential from the mobile device.

68. A non-transitory storage medium having stored thereon processor-executable software instructions configured to cause a processor of a personal article to perform steps comprising:
establishing a close range communication link between the personal article housing a SIM card and a mobile device, wherein said close range communication link is limited by transmitter power or round-trip communication delay to a range of less than about one meter and the personal article is an article worn on a user's body selected from the group consisting of wristwatches and decorative jewelry;
receiving updated provisioning data from the mobile device via the established close range communication link;
terminating the close range communication link upon completing reception of the updated provisioning data; and
storing the received updated provisioning data in the SIM card housed within the personal article.

69. The non-transitory e storage medium of claim 68, wherein the stored processor-executable software instructions are configured to cause a processor to perform further steps comprising:
receiving an authentication credential from the mobile device;
authenticating the mobile device using the received authentication credential; and
terminating the close range communication link prior to receiving the received updated provisioning data if the mobile device is not authenticated.

70. The non-transitory storage medium of claim 69, wherein the stored processor-executable software instructions are configured to cause a processor to perform further steps comprising requesting the authentication credential from the mobile device.

* * * * *